Jan. 19, 1926.

E. KUNIHOLM

BABY CARRIAGE

Filed August 14, 1922

1,569,985

Inventor
ERIC KUNIHOLM
By Southgate & Southgate
ATTORNEYS

Witness
C. F. Nixon.

Patented Jan. 19, 1926.

1,569,985

UNITED STATES PATENT OFFICE.

ERIC KUNIHOLM, OF GARDNER, MASSACHUSETTS, ASSIGNOR TO O. W. SIEBERT COMPANY, OF GARDNER, MASSACHUSETTS.

BABY CARRIAGE.

Application filed August 14, 1922. Serial No. 581,617.

*To all whom it may concern:*

Be it known that I, ERIC KUNIHOLM, a citizen of the United States, residing at Gardner, in the county of Worcester and State of Massachusetts, have invented a new and useful Baby Carriage, of which the following is a specification.

This invention relates to a baby carriage and particularly to the provision of an auxiliary seat structure therein. It is at times desirable to temporarily accommodate a second and usually older child in a baby carriage, but the usual carriage is not well adapted for this purpose.

It is the object of my invention to provide an improved auxiliary seat structure having important advantages in use and capable of convenient and economical manufacture.

A further object of my invention is to provide such a seat structure located substantially within the body of the carriage and preferably so constructed that it may be used by a child facing in either direction.

My invention also contemplates a construction in which a portion of the seat structure is adapted to at times form a portion or continuation of the end of the carriage body.

My invention further relates to arrangements and combinations of parts which will be hereinafter described and more particularly pointed out in the appended claims.

A preferred form of the invention is shown in the drawings, in which

Figure 1:
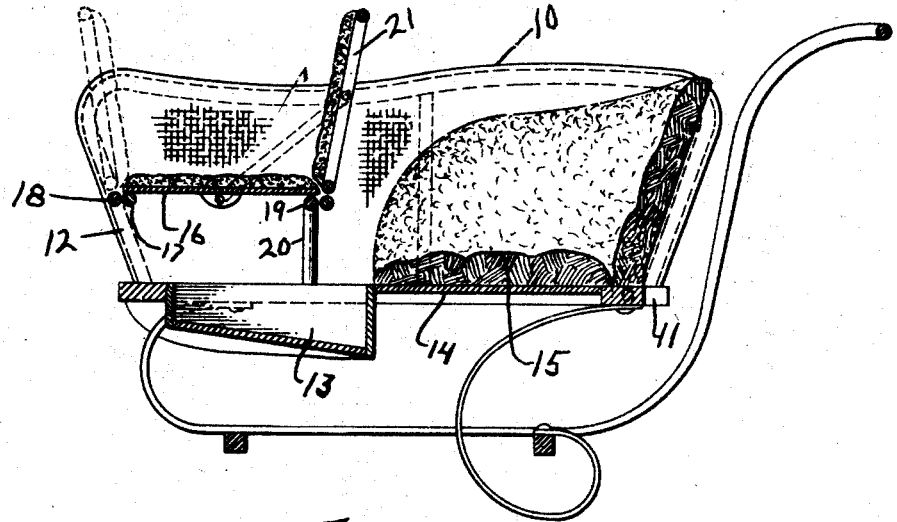
Fig. 1 is a sectional side elevation of a carriage body embodying my improvements.

Referring to the drawings, I have shown parts of a baby carriage including a body having sides 10, a bottom frame 11 and a partial end portion 12. A pocket or recess 13 may be formed in the floor 14 of the carriage body, providing a convenient place for the feet of a child placed upon the usual seat 15.

My auxiliary seat structure preferably comprises a seat 16 secured at its outer side to a cross bar 17 which, in turn, is fixed to a frame member 18 which forms the top edge of the carriage end 12. The opposite side of the seat 16 rests upon a cross rod 19 which, in turn, is supported by posts 20 at each end thereof. The seat 16 is thus held in permanent fixed position substantially within the carriage body.

A back 21 is provided for the auxiliary seat and is secured thereto by links 22, each pivotally connected at one end to the back and at the opposite end to a pivot 23 fixed to the seat 16. One face of the back is preferably upholstered as indicated at 24 and the opposite face may be provided with a suitable covering of reed or other material corresponding in appearance with the outer covering of the carriage body.

Figure 2:
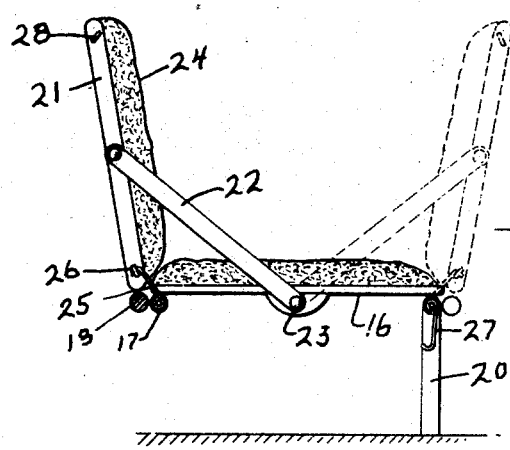
Fig. 2 shows the seat structure in a different position.
Figure 3:
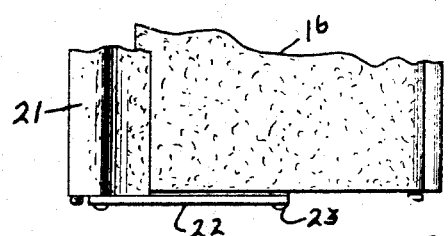
Fig. 3 is a partial plan view of the auxiliary seat.

The back 21 is normally secured in the position shown in Fig. 2 in any convenient manner, as by a hook 25 and eye 26, so that it forms substantially an upward extension of the carriage end 12. When in this position, the auxiliary seat may be used by a child facing inward.

The seat is more commonly used, however, with the back reversed to the position shown in full lines in Fig. 1, in which position it may be secured by additional hooks 27 and eyes 28. In this position the child is seated substantially within the carriage body with its feet extending outside of the body. The raised position of the seat together with the provision of the pocket 13 affords ample room for the feet of the child placed on the regular seat 15.

When the carriage is in use for a single child and the back is positioned as shown in Fig. 2, the seat 16 affords a convenient and safe support for packages or other articles.

It is of particular advantage that the seat is so arranged that the weight of the additional child is supported within the body rather than beyond the end thereof, as has been heretofore proposed.

Having thus described my invention and the advantages thereof, I do not wish to be limited to the details herein disclosed otherwise than as set forth in the claims, but what I claim is:—

1. A baby carriage comprising a body having a seat at one end, an auxiliary seat permanently fixed in raised position at the other end of said body, a back for said seat, a pair of links pivoted directly to said back and to said seat and reversibly connecting the center of each side of the back with the center of each side of the seat, and means to secure either edge portion of said back to an edge portion of said seat.

2. A baby carriage having a body, a seat, a depressed bottom portion, an auxiliary seat substantially overlying said depressed bottom portion and permanently positioned between the sides of the body at a substantially higher level than the first mentioned seat, and a back for said auxiliary seat movable also into position to form a portion of the end of said body or to form the back of an auxiliary seat facing outward.

In testimony whereof I have hereunto affixed my signature.

ERIC KUNIHOLM.